United States Patent Office 3,035,067
Patented May 15, 1962

3,035,067
21-NITRO PREGNANE COMPOUNDS AND PROCESS FOR THE PRODUCTION THEREOF
Howard J. Ringold, Albert Bowers, and George Rosenkranz, Mexico City, Mexico, assignors to Syntex S.A., Mexico City, Mexico, a corporation of Mexico
No Drawing. Filed July 24, 1958, Ser. No. 750,592
Claims priority, application Mexico July 26, 1957
30 Claims. (Cl. 260—397.3)

The present invention relates to cyclopentanophenanthrene derivatives and to a process for the production thereof.

More particularly the present invention relates to novel 21-nitro-$\Delta^4$-pregnen-3,20-dione derivatives which may include one or more of the following substituents, 17$\alpha$-hydroxy, 11-keto, 9$\alpha$-halogen (bromine, chlorine or fluorine) and an additional double bond at C-1(2).

The new 21-nitro-$\Delta^4$-pregnen-3,20-diones, substituted or not, show biological effects which make them potent valuable drugs; 21-nitro-progesterone differs from progesterone in its superior progestational activity; 21-nitro-$\Delta^4$-pregnen-3,11,20-trione, 9$\alpha$-halo-21-nitro-$\Delta^4$-pregnen-3,11,20-triones and 21-nitro-$\Delta^4$-pregnen-17$\alpha$-ol-3,20-dione show anti-estrogenic activity; 21-nitro-$\Delta^4$-pregnen-17$\alpha$-ol-3,11,20-trione, 21-nitro-$\Delta^{1,4}$-pregnadien-17$\alpha$-ol-3,11,20-trione, as well as their 9$\alpha$-halo analogues, have a great anti-inflammatory effect.

In accordance with our invention it has been discovered that the novel 21-nitro pregnene derivatives previously and hereinafter described in detail may be prepared from the corresponding 21-hydroxy pregnane series compounds by reacting the side chain thereof to selectively reduce the 20-keto group of the starting compound to a 20-hydroxy group, by cleaving the glycol thus formed to form the corresponding aldehyde group, by condensing the aldehyde group with nitromethane to form the 21-nitro-20-hydroxy derivative and finally by oxidizing the 20-hydroxy group to a 20-keto group.

The novel final compounds of the present invention may be illustrated by the following formula:

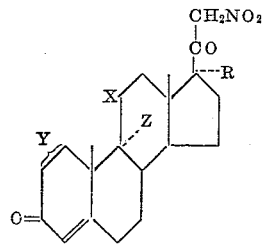

In the above formula X is selected from the group consisting of hydrogen or =O. Z is a halogen selected from the group consisting of bromo, chloro or fluoro. R is hydrogen or hydroxy. Y represents a double or single bond between C-1 and C-2.

The novel compounds above illustrated are prepared by a process outlined by the following equation:

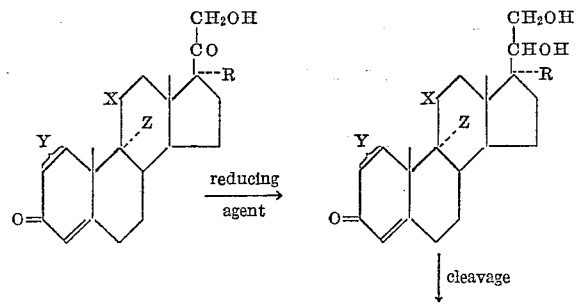

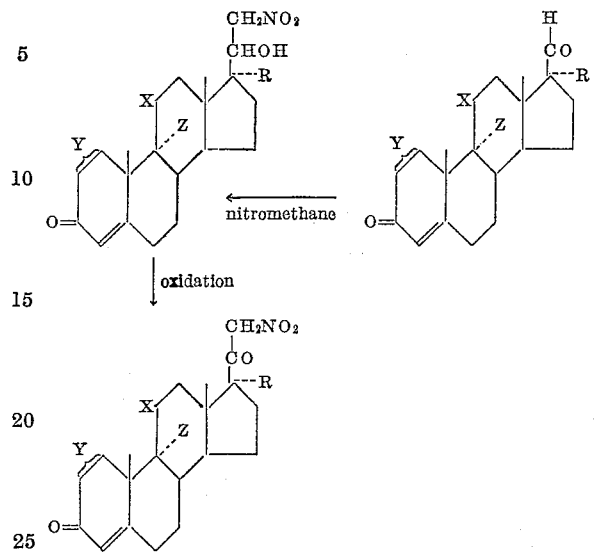

In the above equation Y, Z, X and R represent the same groups as heretofore set forth.

Referring to the above equation a 21-hydroxy-3,20-diketo-$\Delta^4$-pregnene compound which may be substituted as indicated, or further unsaturated at C-1(2) as indicated, was selectively reduced to transform the 20-keto group to a 20-hydroxy group. For this purpose a desirable reducing agent was 0.5 molar equivalent (100% excess over theory) of sodium borohydride. Preferably the reaction was carried out in an organic solvent such as methanol at a low temperature of the order of 0° C. for a short period of time of the order or one hour. The resultant 20$\beta$,21-glycol, obtained after conventional separation and purification, was then cleaved with periodic acid to give the aldehyde. Preferably the reaction with periodic acid was performed in an organic solvent such as dioxane under an atmosphere of nitrogen and for a period of about 3 hours. The aldehyde thus formed was then condensed with nitromethane preferably in the presence of sodium methoxide to give the corresponding 21-nitro-20-ol derivative. The 21-hydroxy group of this last derivative was then oxidized with a conventional oxidizing agent for secondary hydroxyl groups such as chromic acid in acetic acid or chromium trioxide and sulfuric acid.

The following specific examples serve to illustrate but are not intended to limit the present invention.

*Example I*

A solution of 5 g. of desoxycorticosterone in 800 cc. of methanol was cooled to 0° C. and slowly treated with stirring with 0.5 mol of sodium borohydride, while the temperature was maintained below 0° C. The mixture was stirred for 1 hour further at 0° C., acidified with acetic acid, evaporated to dryness under reduced pressure and the residue was extracted several times with hot benzene. The benzene extract was washed with water, dried over anhydrous sodium sulfate and evaporated to dryness under reduced pressure. The residue was purified by chromatography on silica, thus giving $\Delta^4$-pregnen-20,21-diol-3-one.

3.3 g. of this glycol was mixed with 200 cc. of dioxane and slowly treated with 2.1 g. of periodic acid dihydrate, under stirring and under an atmosphere of nitrogen. The stirring was continued under nitrogen for 3 hours further and then water was added. The precipitate formed was collected, washed with water, dried and crystallized from benzene-hexane, thus producing the C-20 aldehyde, that is, 17-formyl-Δ⁴-androsten-3-one.

A mixture of 1 g. of the above compond, 20 cc. of methanol and 0.8 cc. of nitromethane was slowly mixed with a solution of 0.6 g. of sodium methoxide in 20 cc. of methanol, with stirring under an atmosphere of nitrogen. The mixture was stirred for 16 hours under nitrogen and then diluted with 40 cc. of ether. The precipitate formed was collected by filtration, dried under vacuum, suspended in 100 cc. of 2 N hydrochloric acid and stirred for 30 minutes. The precipitate was collected and chromatographed on washed alumina, thus yielding 21-nitro-Δ⁴-pregnen-20-ol-3-one.

500 mg. of 21-nitro-Δ⁴-pregnen-20-ol-3-one was dissolved in 25 cc. of acetone, cooled to 0° C. and mixed with an oxidizing reagent prepared from 200 mg. of chromium trioxide, 0.18 cc. of concentrated sulfuric acid and 1 cc. of water, which reagent was added dropwise to the stirred solution while the temperature of the mixture was kept at 0° C., and in the course of 2 minutes. After stirring for 10 minutes further at 0° C. the mixture was diluted with water and extracted with ether. The extract was washed with water, dried over anhydrous sodium sulfate and evaporated. Crystallization of the residue from acetone-hexane furnished 21-nitro-Δ⁴-pregnen-3,20-dione (21-nitro-progesterone).

In another experiment 21-nitro-Δ⁴-pregnen-20-ol-3-one was oxidized equal successfully by treating 500 mg. of the compound in 10 cc. of acetic acid with a solution of 200 mg. of chromic acid in 5 cc. of 80% acetic acid, stirring the mixture for 2 hours at room temperature, diluting with water and working up the product as described above.

*Example II*

When in the method of Example I the desoxycorticosterone was substituted by cortisone, there was obtained as final product 21-nitro-Δ⁴-pregnen-17α-ol-3,11,20-trione.

*Example III*

When in the method of Example I the desoxycorticosterone was substituted by 9α-fluoro-prednisone, there was obtained 9α-fluoro-21-nitro-Δ¹,⁴-pregnadien-17α-ol-3,11,20-trione.

*Example IV*

Following the method described in Example I, Δ⁴-pregnen-21-ol-3,11,20-trione was converted into 21-nitro-Δ⁴-pregnen-3,11,20-trione; 9α-bromo-Δ⁴-pregnen-21-ol-3,11,20-trione gave 9α-bromo-21-nitro-Δ⁴-pregnen-3,11,20-trione; 9α-chloro-Δ⁴-pregnen-21-ol-3,11,20-trione produced 9α-chloro-21-nitro-Δ⁴-pregnen-3,11,20 trione; 9α-fluoro-Δ⁴-pregnen-21-ol-3,11,20-trione gave 9α-fluoro-21-nitro-Δ⁴-pregnen-3,11,20-trione; Δ⁴-pregnen-17α,21- diol-3,20-dione (compound "S" of Reichstein) gave 21-nitro-Δ⁴-pregnen-17α-ol-3,20-dione; 9α-bromo-cortisone yielded 9α-bromo-21-nitro-Δ⁴-pregnen-17α-ol-3,11,20-trione; 9α-chloro-cortisone gave 9α-chloro-21-nitro-Δ⁴-pregnen-17α-ol-3,11,20-trione; 9α-fluoro-cortisone gave 9α-fluoro-21-nitro-Δ⁴-pregnen-17α-ol-3,11,20-trione; prednisone gave 21-nitro-Δ¹,⁴-pregnadien-17α-ol-3,11,20-trione; 9α-bromo-prednisone gave 9α-bromo-21-nitro-Δ¹,⁴-pregnadien-17α-ol-3,11,20-trione; 9α-chloro-prednisone furnished 9α-chloro-21-nitro-Δ¹,⁴-pregnadien-17α-ol-3,11,20-trione.

We claim:
1. A process for the production of 21-nitro-3,20-diketo-Δ⁴-pregnene compounds comprising reacting the corresponding 21-hydroxy compounds with a reducing agent to form the corresponding 20,21-glycol derivatives, cleaving the glycol side chain of these derivatives to form the corresponding 17-formyl compounds with periodic acid, condensing the formyl compounds with nitro methane to form the corresponding 20-hydroxy-21-nitro compounds and oxidizing the 20-hydroxy group thereof to a 20-keto group with chromic acid.

2. Compounds of the following formula:

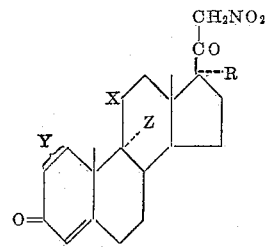

wherein X is selected from the group consisting of =O and hydrogen, Z is selected from the group consisting of hydrogen, bromo, fluoro and chloro, Y is selected from the group consisting of a double bond between C-1 and C-2 and a saturated linkage between C-1 and C-2 and R is selected from the group consisting of OH and hydrogen.

3. 21-nitro-Δ⁴-pregnen-20-β-ol-3-one.
4. 21-nitro-Δ⁴-pregnen-20-β-ol-3,11-dione.
5. 9α-bromo-21-nitro-Δ⁴-pregnen-20β-ol-3,11-dione.
6. 9α-chloro-21-nitro-Δ⁴-pregnen-20β-ol-3,11-dione.
7. 9α-fluoro-21-nitro-Δ⁴-pregnen-20β-ol-3,11-dione.
8. 21-nitro-Δ⁴-pregnen-17α,20β-diol-3-one.
9. 21-nitro-Δ⁴-pregnen-17α,20β-ol-3,11-dione.
10. 9α-bromo-21-nitro-Δ⁴-pregnen-17α,20β-diol-3,11-dione.
11. 9α - chloro - 21 - nitro - Δ⁴ - pregnen - 17α,20β-diol-3,11-dione.
12. 9α - fluoro - 21 - nitro - Δ⁴ - pregnen - 17α,20β-diol-3,11-dione.
13. 21-nitro-Δ¹,⁴-pregnadien-17α,20β-diol-3,11-dione.
14. 9α - bromo - 21 - nitro - Δ¹,⁴ - pregnadien - 17α,20β-diol-3,11-dione.
15. 9α - chloro - 21 - nitro - Δ¹,⁴ - pregnadien - 17α,20β-diol-3,11-dione.
16. 9α - fluoro - 21 - nitro - Δ¹,⁴ - pregnadien - 17α-20β-diol-3,11-dione.
17. 21-nitro-progesterone.
18. 21-nitro-Δ⁴-pregnen-3,11-trione.
19. 9α-bromo-21-nitro-Δ⁴-pregnen-3,11,20-trione.
20. 9α-chloro-21-nitro-Δ⁴-pregnen-3,11,20-trione.
21. 9α-fluoro-21-nitro-Δ⁴-pregnen-3,11,20-trione.
22. 21-nitro-Δ⁴-pregnen-17α-ol-3,20-dione.
23. 21-nitro-Δ⁴-pregnen-17α-ol-3,11,20-trione.
24. 9α - bromo - 21 - nitro - Δ⁴ - pregnen - 17α - ol-3,11,20-trione.
25. 9α - chloro - 21 - nitro - Δ⁴ - pregnen - 17α - ol-3,11,20-trione.
26. 9α - fluoro - 21 - nitro - Δ⁴ - pregnen - 17α - ol-3,11,20-trione.
27. 21 - nitro - Δ¹,⁴ - pregnadien - 17α - ol - 3,11,20-tritone.
28. 9α - bromo - 21 - nitro - Δ¹,⁴ - pregnadien - 17α-ol-3,11,20-tritone.
29. 9α - chloro - 21 - nitro - Δ¹,⁴ - pregnadien - 17α-ol-3,11,20-trione.
30. 9α - fluoro - 21 - nitro - Δ¹,⁴ - pregnadien - 17α-ol-3,11,20-trione.

No references cited.